(12) United States Patent
Kwon et al.

(10) Patent No.: US 7,554,630 B2
(45) Date of Patent: Jun. 30, 2009

(54) LIQUID CRYSTAL DISPLAY DEVICE HAVING COMMON LINE PARALLEL TO AND BETWEEN GATE LINE AND PIXEL ELECTRODE WITH LIGHT SHIELD PROJECTING FROM COMMON LINE PARALLEL TO DATA LINE AND OVERLAPPING AREA BETWEEN DATA LINE AND PIXEL ELECTRODE

(75) Inventors: Keuk Sang Kwon, Kyongsangbuk-do (KR); Dae Lim Park, Kyongsangbuk-do (KR); Seong Soo Hwang, Kumi-shi (KR); Sung Gu Kang, Kyeongju-shi (KR); Jong Hwae Lee, Seoul (KR); Bung Goo Kim, Seoul (KR); Jong A Choi, Seongnam-shi (KR)

(73) Assignee: LG Display Co., Ltd., Seoul (KR)

( * ) Notice: Subject to any disclaimer, the term of this patent is extended or adjusted under 35 U.S.C. 154(b) by 597 days.

(21) Appl. No.: 11/024,807

(22) Filed: Dec. 30, 2004

(65) Prior Publication Data

US 2005/0219436 A1    Oct. 6, 2005

(30) Foreign Application Priority Data

Mar. 30, 2004    (KR)    ...................... 10-2004-0021678

(51) Int. Cl.
    *G02F 1/1333*    (2006.01)
(52) U.S. Cl. ...................................................... 349/111
(58) Field of Classification Search ........................ None
    See application file for complete search history.

(56) References Cited

U.S. PATENT DOCUMENTS 5,402,141 A * 3/1995 Haim et al. .................... 345/88

(Continued)

FOREIGN PATENT DOCUMENTS

CN    1258357 A    6/2000

(Continued)

OTHER PUBLICATIONS

Preliminary Search Report issued by the French Patent Office on Jun. 22, 2005.

*Primary Examiner*—David Nelms
*Assistant Examiner*—John Heyman
(74) *Attorney, Agent, or Firm*—McKenna Long & Aldridge LLP

(57) ABSTRACT

An LCD device with improved an aperture ratio and decreased parasitic capacitance has a passivation layer of an inorganic material and which includes a gate line on a first substrate; a gate insulating layer on an entire surface of the first substrate including the gate line; a data line on the gate insulating layer in perpendicular to the gate line, to define a pixel region; a thin film transistor at a crossing portion of the gate and data lines; a passivation layer on the entire surface of the first substrate including the thin film transistor; a pixel electrode on the passivation layer, for being connected with a drain electrode of the thin film transistor; and a light-shielding metal for receiving a voltage, formed between the data line and the pixel electrode, to prevent a parasitic capacitance between the data line and the pixel electrode.

11 Claims, 6 Drawing Sheets

U.S. PATENT DOCUMENTS

| | | | |
|---|---|---|---|
| 5,459,596 A * | 10/1995 | Ueda et al. | 349/39 |
| 5,600,461 A | 2/1997 | Ueda et al. | |
| 5,686,977 A * | 11/1997 | Kim et al. | 349/38 |
| 5,696,566 A | 12/1997 | Kim et al. | |
| 5,708,483 A | 1/1998 | Asai | |
| 5,767,926 A | 6/1998 | Kim et al. | |
| 5,847,780 A | 12/1998 | Kim et al. | |
| 5,995,175 A | 11/1999 | Kim et al. | |
| 6,040,882 A * | 3/2000 | Jun et al. | 349/39 |
| 6,259,200 B1 | 7/2001 | Morita et al. | |
| 6,331,845 B1 * | 12/2001 | Kitajima et al. | 345/88 |
| 6,404,466 B1 * | 6/2002 | Miyahara | 349/48 |
| 6,504,585 B2 | 1/2003 | Ohkawara et al. | |
| 6,956,634 B2 | 10/2005 | Kim et al. | |
| 7,092,049 B2 * | 8/2006 | Kadotani et al. | 349/110 |
| 2003/0137622 A1 | 7/2003 | Song | |
| 2003/0202134 A1 | 10/2003 | Kim | |

FOREIGN PATENT DOCUMENTS

| | | |
|---|---|---|
| DE | 100 13 219 A1 | 10/2000 |
| EP | 0 592 063 A3 | 3/1993 |
| EP | 0 660 160 A1 | 6/1995 |
| JP | 05-203994 | 8/1993 |
| JP | 08-160451 | 6/1996 |
| JP | 09-101545 | 4/1997 |
| JP | 10 039 336 | 2/1998 |
| JP | 10-39336 | 2/1998 |
| JP | 10-082996 | 3/1998 |
| JP | 2000-122093 | 4/2000 |

\* cited by examiner

LIQUID CRYSTAL DISPLAY DEVICE HAVING COMMON LINE PARALLEL TO AND BETWEEN GATE LINE AND PIXEL ELECTRODE WITH LIGHT SHIELD PROJECTING FROM COMMON LINE PARALLEL TO DATA LINE AND OVERLAPPING AREA BETWEEN DATA LINE AND PIXEL ELECTRODE

This present invention claims the benefit of the Korean Application No. P2004-21678 filed on Mar. 30, 2004, which is hereby incorporated by reference for all purposes as if fully set forth herein.

BACKGROUND OF THE INVENTION

1. Field of the Invention

The present invention relates to a liquid crystal display (LCD) device, and more particularly, to an LCD device with improved aperture ratio and reduced parasitic capacitance.

2. Discussion of the Related Art

LCD devices, one of a number of flat display technologies, have improved performance characteristics including high contrast ratio, great gray level, high picture quality, and low power consumption.

For example, the LCD device having a thin profile may be fabricated in a wall-mountable type for a monitor of a television. Also, because the LCD device achieves light weight and low power consumption, the LCD device may be applicable as monitors for notebook computers, a personal computers, television, and aircraft.

The LCD device generally includes a thin film transistor array substrate, a color filter array substrate, and a liquid crystal layer. In particular, the thin film transistor array substrate includes a thin film transistor, a pixel electrode, and a storage capacitor in a pixel region defined by a gate line and a data line. Also, the color filter array substrate includes a color filter layer and a common electrode. The liquid crystal layer is formed between the thin film transistor array substrate and the color filter array substrate. By applying a voltage to the electrodes, liquid crystal molecules of the liquid crystal layer are aligned, thereby controlling the amount of light transmitted to displaying images.

A related art LCD device will be described with reference to the accompanying drawings.

FIG. 1 is a plan view of a related art LCD device. FIG. 2 is a cross sectional view of a related art LCD device along I-I' of FIG. 1.

A related art LCD device includes a thin film transistor array substrate 111, a color filter array substrate 121, and a liquid crystal layer 131. The thin film transistor array substrate 111 and the color filter array substrate 121 are bonded to each other at a predetermined interval, and the liquid crystal layer 131 is formed between the two bonded substrates 111 and 121. Also, because the LCD device does not emit light, it requires an additional light source, for example, a backlight 150. The backlight 150 is provided under the thin film transistor array substrate 111.

As illustrated in FIG. 1 and FIG. 2, the thin film transistor array substrate 111 includes a gate line 112, a data line 115, a pixel electrode 117, a thin film transistor TFT, and a storage capacitor. The gate line 112 and the data line 115 are formed perpendicular to each other to define a pixel region. Also, the pixel electrode 117 is formed in each pixel region to apply a signal voltage to the liquid crystal layer 131 according to a data signal. Then, the thin film transistor TFT is formed at a crossing portion of the gate line 112 and the data line 115, wherein the thin film transistor TFT is turned-on/off based on a scanning signal applied to the gate line 112 to transmit the data signal applied to the data line to the pixel electrode 117. The storage capacitor is formed to decrease a level-shift voltage, and to sustain pixel information during a non-select period.

In addition, a gate insulating layer 113 is formed between the gate line 112 and the data line 115, and a passivation layer 116 is formed between the thin film transistor TFT and the pixel electrode 117.

Accordingly, the thin film transistor TFT is comprised of a gate electrode 112a, the gate insulating layer 113, a semiconductor layer 114, a source electrode 115a, and a drain electrode 115b. The gate electrode 112a is diverged from the gate line 112, and the gate insulating layer 113 is formed on an entire surface of the thin film transistor array substrate 111 including the gate electrode 112a. Then, the semiconductor layer 114 is formed on the gate insulating layer above the gate electrode 112a. Also, the source electrode 115a is diverged from the data line 115 and is overlapped with one side of the semiconductor layer 114. The drain electrode 115b is overlapped with the other side of the semiconductor layer 114, and the drain electrode 115b penetrating the passivation layer 116 is electrically connected with the pixel electrode 117, thereby applying a voltage to the pixel electrode.

A storage capacitor Cst is comprised of a capacitor electrode 126, the pixel electrode 117, the gate insulating layer 113, and the passivation layer 116. The capacitor electrode 126 is formed on the same layer as the gate line 112 in parallel. Also, the gate insulating layer 113 and the passivation layer 116 are interposed between the capacitor electrode 126 and the pixel electrode 117. Thus, the storage capacitor sustains electric charges of the liquid crystal layer during a turning-off block of the thin film transistor TFT.

Although not illustrated, the storage capacitor may be formed above the gate line by using a predetermined portion of the gate line as the capacitor electrode.

The storage capacitor has a structure of forming an insulating layer between capacitor lower and upper electrodes. In this case, the capacitor electrode 126 serves as the capacitor lower electrode, the gate insulating layer 113 and the passivation layer 116 serve as the insulating layer, and a predetermined portion of the pixel electrode 117 overlapped with the capacitor electrode 126 serves as the capacitor upper electrode.

The gate insulating layer 113 is formed of an inorganic insulating material such as silicon nitride $SiN_x$ or silicon oxide $SiO_x$, having a dielectric constant of about 7.5, at a thickness between 1500 Å and 5000 Å. Also, the passivation layer 116 is formed of an organic insulating material such as BCB (BenzoCycloButene) or acrylic resin, having a low dielectric constant of about 3.4, at a thickness between 3 μm and 5 μm.

When the passivation layer 116 is formed of the organic insulating material such as BCB, it is possible to decrease parasitic capacitance between a data line layer and the pixel electrode. Accordingly, the pixel electrode 117 may be overlapped with the data line to realize a high aperture ratio. However, if the organic insulating layer of BCB is used for the passivation layer, the passivation layer 116 becomes thick. Thus, it is impossible to use the passivation layer of the organic insulating layer for a small-sized LCD device such as a mobile phone.

In this regard, in a small-sized LCD device, the passivation layer is formed of the inorganic insulating material such as silicon nitride $SiN_x$. However, when using a passivation layer made of an inorganic insulating material, the parasitic capacitance increases greatly as compared with the passivation layer made of the organic insulating material, so that it is impossible to overlap the pixel electrode with the data line. If the parasitic capacitance increases between the data line and the pixel electrode, the parasitic capacitance causes a D.C. voltage offset relative to an A.C. voltage applied to the liquid crystal layer, ΔVp, thereby generating flicker, image sticking, and non-uniformity of luminance in the images.

Furthermore, the color filter array substrate 121 is formed opposite to the thin film transistor array substrate 111. The color filter array substrate 121 includes a color filter layer 123 of R(red)/G(green)/B(blue) pigments arranged in order, a black matrix layer 122 for dividing R/G/B cells and preventing light leakage, and a common electrode 124 for applying the voltage to the liquid crystal layer 131.

In the color filter layer 123, generally, pixels having the R/G/B pigments are arranged in order, wherein each sub-pixel has one pigment, and the sub-pixels are separately driven, thereby displaying a color in one pixel by compound of the sub-pixels.

Generally, the black matrix layer 122 is formed to correspond with the edge of the sub-pixel and the thin film transistor of the thin film transistor array substrate, thereby preventing the light leakage on the portions having an unstable electric field.

As described above, in case of using the passivation layer of the inorganic insulating material, it is impossible to overlap the pixel electrode with the data line. Accordingly, the black matrix layer 122 is overlapped with the pixel electrode 117 to prevent the light leakage between the pixel electrode and the data line. At this time, because the pixel electrode 117 is formed on the thin film transistor array substrate, and the black matrix layer 122 is formed on the color filter array substrate, it is necessary to provide a bonding margin in the black matrix layer 122 to prevent the light leakage. The bonding margin may be varied on bonding apparatus. However, as illustrated in FIG. 2, preferably, the black matrix layer 122 is overlapped with the pixel electrode 117 by a minimum of 5 μm to 6.7 μm.

However, the related art LCD device has the following disadvantages.

First, the passivation layer is formed of the inorganic insulating material, the pixel electrode is not overlapped with the adjacent data line. Accordingly, there is a requirement for providing the sufficient bonding margin to overlap the black matrix layer with the pixel electrode, thereby preventing the light leakage between the pixel electrode and the data line. Thus, the size of the black matrix layer increases due to the bonding margin, so that the aperture ratio of the LCD device lowers.

If the passivation layer is formed of the inorganic insulating layer, the pixel electrode is formed not to overlap the adjacent data line. In this state, the dielectric constant of the passivation layer is higher than the dielectric constant of the organic insulating layer, so that parasitic capacitance is generated between the pixel electrode and the data line. Because of the parasitic capacitance, a source delay is generated which decreases a data voltage level. Thus, the luminance is changed due to the source delay, so that vertical crosstalk generates, thereby deteriorating the picture quality.

SUMMARY OF THE INVENTION

Accordingly, the present invention is directed to an LCD device that substantially obviates one or more problems due to limitations and disadvantages of the related art.

An advantage of the present invention is to provide an LCD device, to realize high resolution without light leakage by forming a first black matrix layer of a metal material having a high optical density and forming a second black matrix layer of resin to cover the first black matrix layer.

Additional advantages and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these and other advantages and in accordance with the purpose of the invention, as embodied and broadly described herein, an LCD device includes a gate line on a first substrate; a gate insulating layer on an entire surface of the first substrate including the gate line; a data line on the gate insulating layer substantially perpendicular to the gate line, to define a pixel region; a thin film transistor at a crossing portion of the gate and data lines; a passivation layer on a surface of the first substrate including the thin film transistor; a pixel electrode on the passivation layer connected with a drain electrode of the thin film transistor; and a light-shielding metal preventing a parasitic capacitance between the data line and the pixel electrode.

The light-shielding metal projects from the gate line.

In addition, the LCD device further includes a common line in parallel with the gate line. The light-shielding metal projects from the common line.

Also, the passivation layer is formed of an inorganic insulating material, wherein the inorganic insulating material is silicon nitride $SiN_x$ or silicon oxide $SiO_x$.

In addition, the LCD device includes a second substrate having a black matrix layer, a color filter layer and a common electrode, in opposite to the first substrate.

The black matrix layer has a corner provided on the same line as a corner of the light-shielding metal.

Also, the light-shielding metal is overlapped with the pixel electrode and the data line.

Also, the light-shielding metal is overlapped with the pixel electrode, and has a corner aligned in correspondence with a corner of the data line.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention.

In the drawings.

DETAILED DESCRIPTION OF THE INVENTION

Reference will now be made in detail to embodiments of the present invention, examples of which are illustrated in the accompanying drawings. Wherever possible, the same reference numbers will be used throughout the drawings to refer to the same or like parts.

Hereinafter, an LCD device according to a first embodiment of the present invention will be described with reference to the accompanying drawings.

Figure 1:
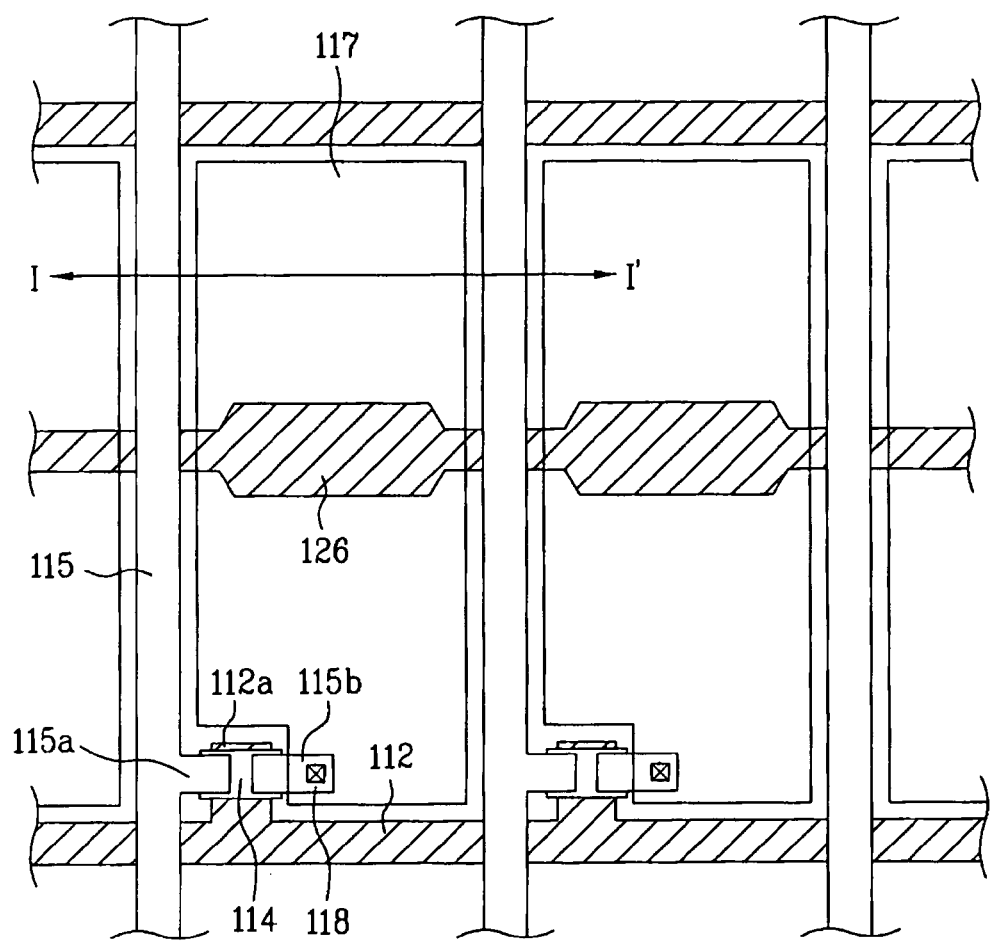
FIG. 1 is a plan view of a related art LCD device.
Figure 2:
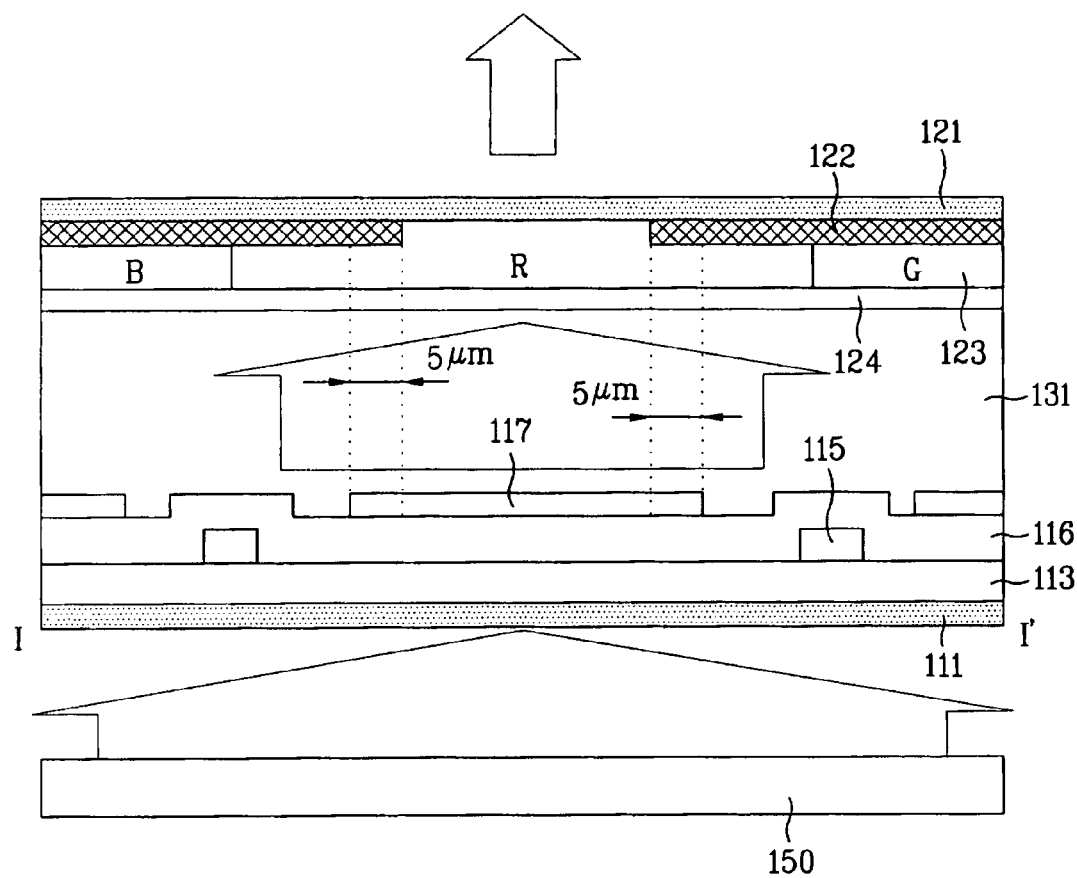
FIG. 2 is a cross sectional view of a related art LCD device along I-I' of FIG. 1.
Figure 3:
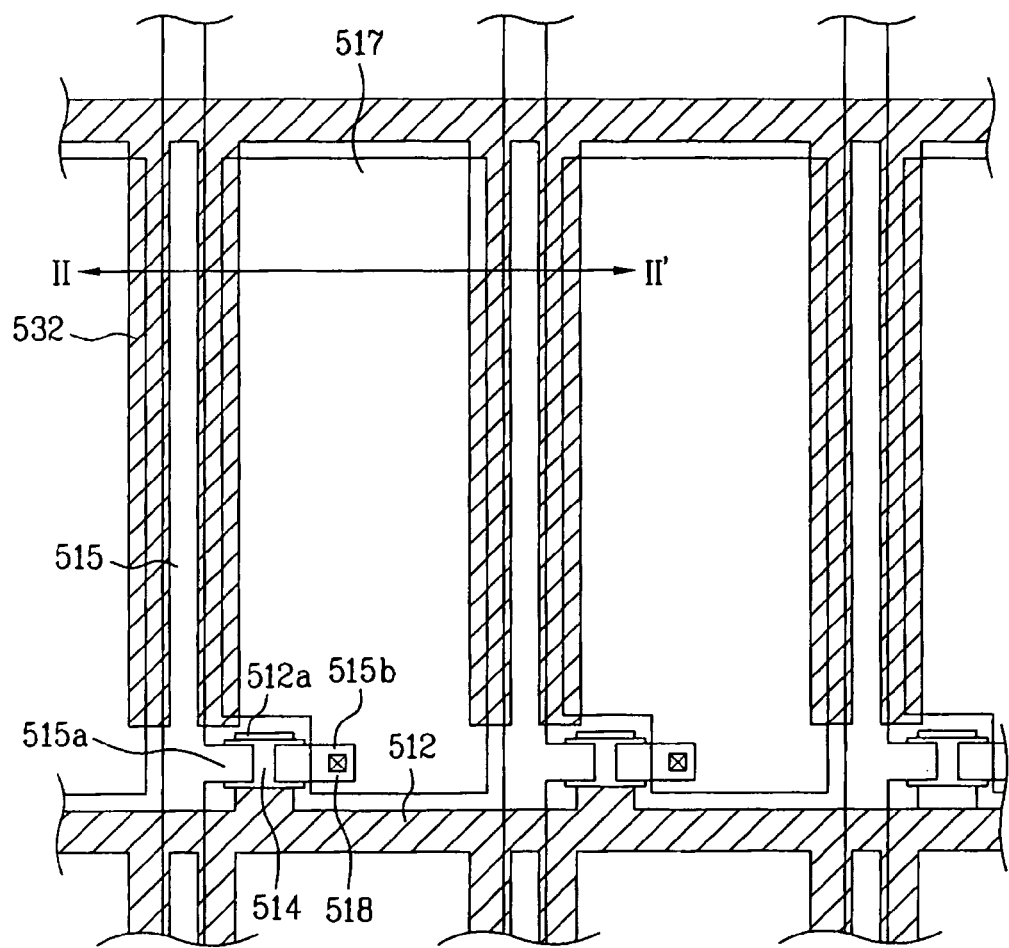
FIG. 3 is a plan view of an LCD device according to the first embodiment of the present invention.
Figure 4:
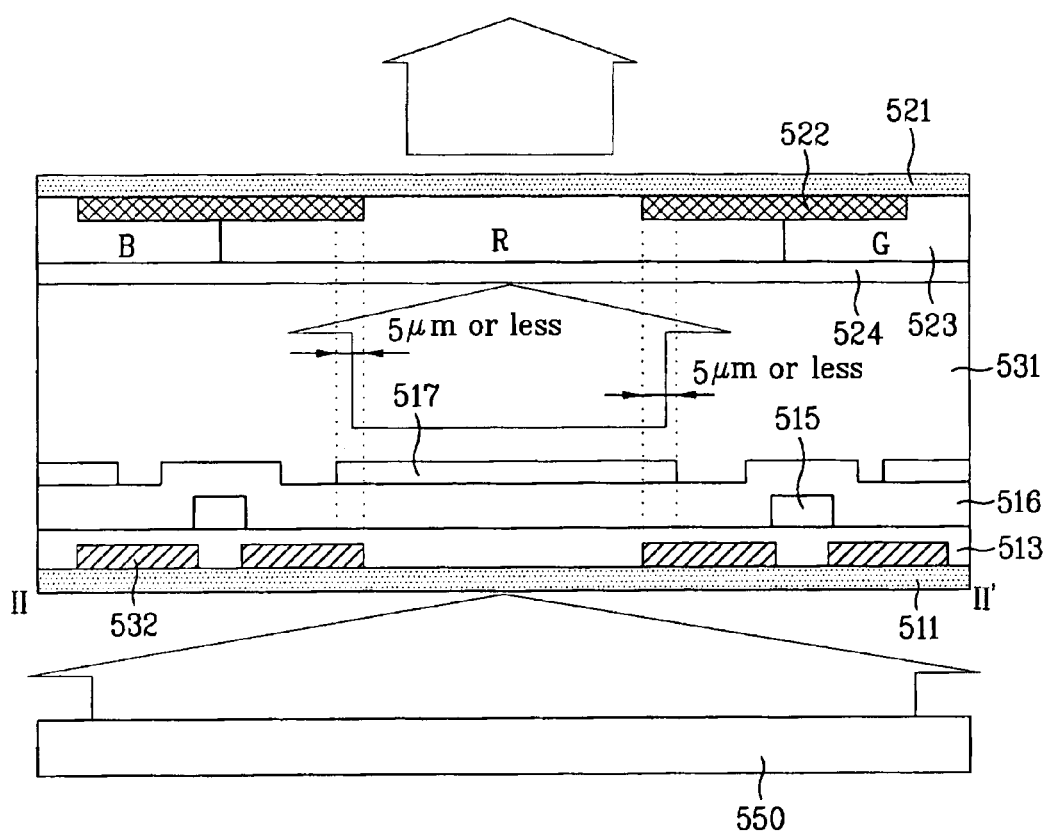
FIG. 4 is a cross sectional view of an LCD device along II-II' of FIG. 3.

FIG. 3 is a plan view of an LCD device according to the first embodiment of the present invention. FIG. 4 is a cross sectional view of an LCD device along II-II' of FIG. 3.

As illustrated in FIG. 3 and FIG. 4, the LCD device according to the first embodiment of the present invention includes a thin film transistor array substrate 511, a color filter array substrate 521, and a liquid crystal layer 531. The thin film transistor array substrate 511 and the color filter array substrate 521 are bonded to each other at a predetermined interval, and the liquid crystal layer 531 is formed between the thin film transistor array substrate 511 and the color filter array substrate 521. Also, a backlight 550 is formed to uniformly provide the light to the bonded substrates 511 and 521, wherein the backlight 550 is formed under the thin film transistor array substrate 511.

In more detail, as illustrated in FIG. 3 and FIG. 4, the thin film transistor array substrate 511 includes a gate line 512, a data line 515, a gate insulating layer 513, a gate electrode 512a, a semiconductor layer 514, a source electrode 515a, a drain electrode 515b, a passivation layer 516, a contact hole 518, a pixel electrode 517, and a light-shielding metal 532. The gate line 512 is formed substantially perpendicular to the data line 515 to define a pixel region. Then, the gate insulating layer 513 is formed between the gate line 512 and the data line 515, and the gate electrode 512 is projecting from the gate line 512a at a crossing portion of the gate line 512 and the data line 515. Also, the semiconductor layer 514 is formed on the gate insulating layer 513 above the gate electrode 512a. In addition, the source electrode 515a projecting from the data line 515 is overlapped with one side of the semiconductor layer 514, and the drain electrode 515b formed at a predetermined interval from the source electrode 515a is overlapped with the other side of the semiconductor layer 514. The passivation layer 516 is formed on an entire surface of the thin film transistor array substrate including the source and drain electrodes 515a and 515b, and the contact hole 518 is formed in the passivation layer 516 above the drain electrode 515b. Then, the pixel electrode 517 is formed in the pixel region, for being connected with the drain electrode 515b by the contact hole 518 of the passivation layer 516, wherein the pixel electrode 517 is formed of a transparent conductive material of ITO or IZO. The light-shielding metal 532 projecting from the gate line 512 is formed between the data line 515 and the pixel electrode 517 along the data line 515, to prevent a parasitic capacitance between the pixel electrode 517 and the data line 515.

The passivation layer 516 is formed of an inorganic insulating material, for example, $SiN_x$ or $SiO_x$, which has easiness in deposition and thinness, to prevent step coverage. Also, the light-shielding metal 532 and the gate line 512 are formed of a low-resistance metal layer of a light-shielding material having low resistivity, for example, copper Cu, aluminum Al, aluminum neodymium AlNd, molybdenum Mo, chrome Cr, titanium Ti, tantalum Ta, or molybdenum-tungsten MoW.

The color filter array substrate 521 is formed opposite to the thin film transistor array substrate 511. The color filter array substrate 521 includes a black matrix layer 522, a color filter layer 523, and a common electrode 524. The black matrix layer 522 is overlapped with the edge of the pixel region and thin film transistor region, to prevent light leakage, wherein the black matrix layer 522 is formed of chrome oxide CrOx, chrome Cr, or carbon-type organic material. The color filter layer 523 is formed between portions of the black matrix layer 522 to realize R(red)/G(green)/B(blue) colors. Also, the common electrode 524 is formed on the color filter layer 523 to form an electric field with the pixel electrode 517, the electric field for controlling the liquid crystal layer.

Herein, the light-shielding metal 532 is formed along the data line 515, and the light-shielding metal 532 is formed of the same material and on the same layer as the gate line 512. Also, the light-shielding metal 532 is formed between the data line 515 and the pixel electrode 517e. In addition, the light-shielding metal 532 is formed as one body with the gate line 512 to apply the electric field, and is overlapped with the data line 515 and the pixel electrode 517. Or, the light-shielding metal 532 is overlapped with the pixel electrode 517, and a corner of the light-shielding metal 532 is positioned on the same line as a corner of the black matrix layer 522.

By applying a constant voltage to the light-shielding metal 532 connected with the gate line 512, a constant electric field is generated. Thus, as compared with a related art, it is possible to decrease the parasitic capacitance formed between the data line 515 and the pixel electrode 517 by an electric field effect of the light-shielding metal 532. That is, because the light-shielding metal 532 overlaps the data line 515 with the pixel electrode 517 there between, when the electric field is applied to the light-shielding metal 532, a parasitic capacitance is generated between the light-shielding metal 532 and the data line 515. A parasitic capacitance is also generated between the light-shielding metal 532 and the pixel electrode 517. Accordingly, it is possible to decrease the parasitic capacitance generated between the data line 515 and the pixel electrode 517 with the light-shielding metal 532, thereby preventing vertical crosstalk. As a result, the picture quality of the LCD device improves.

The light-shielding metal 532 is formed between the data line and the pixel electrode on the same substrate (thin film transistor array substrate), thereby preventing the light leakage between the data line 515 and the pixel electrode 517 by the light-shielding metal 532. Accordingly, it is possible to decrease a bonding margin between the black matrix layer 522 of the color filter array substrate 521 and the pixel electrode 517 of the thin film transistor array substrate 511, so that an area of the black matrix layer 522 decreases, and a transmission area of the pixel region increases.

That is, in the related art LCD device, the bonding margin between the black matrix layer 522 and the pixel electrode 517 is about 5 μm or more. However, in the LCD device according to the present invention, the corner of the black matrix layer is aligned in correspondence with the light-shielding metal, thereby maximizing an aperture ratio of the LCD device.

Because the present invention may be applied to an LCD device for mobile phones having a 120 ppi to 150 ppi pixel density, the aperture ratio increases at a maximum percentage of 18%. Furthermore, the present invention may be applicable to an LCD device of a model for a mobile phone having about 180 ppi pixel density.

That is, the light-shielding metal 532 decreases the parasitic capacitance between the data line and the pixel electrode, and also prevents the light leakage between the data line and the pixel electrode, thereby improving the aperture ratio by decreasing the area of the black matrix layer 522.

Furthermore, the light-shielding metal may be connected with the fore gate line to receive the voltage, or the light-shielding metal may be connected with an additional common line to receive the voltage.

In another aspect, a structure of connecting a light-shielding metal with a storage line according to the second and third embodiments of the present invention will be described as follows.

Figure 5:
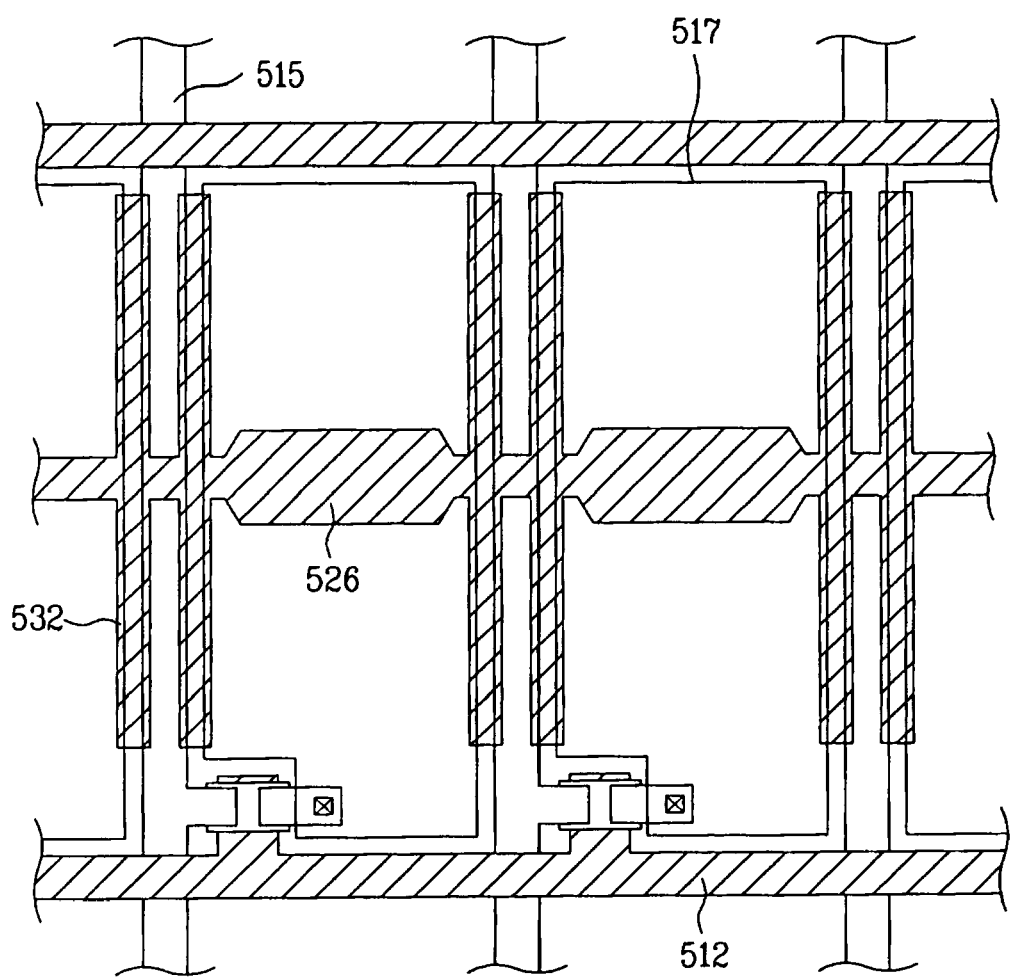
FIG. 5 is a plan view of an LCD device according to the second embodiment of the present invention.
Figure 6:
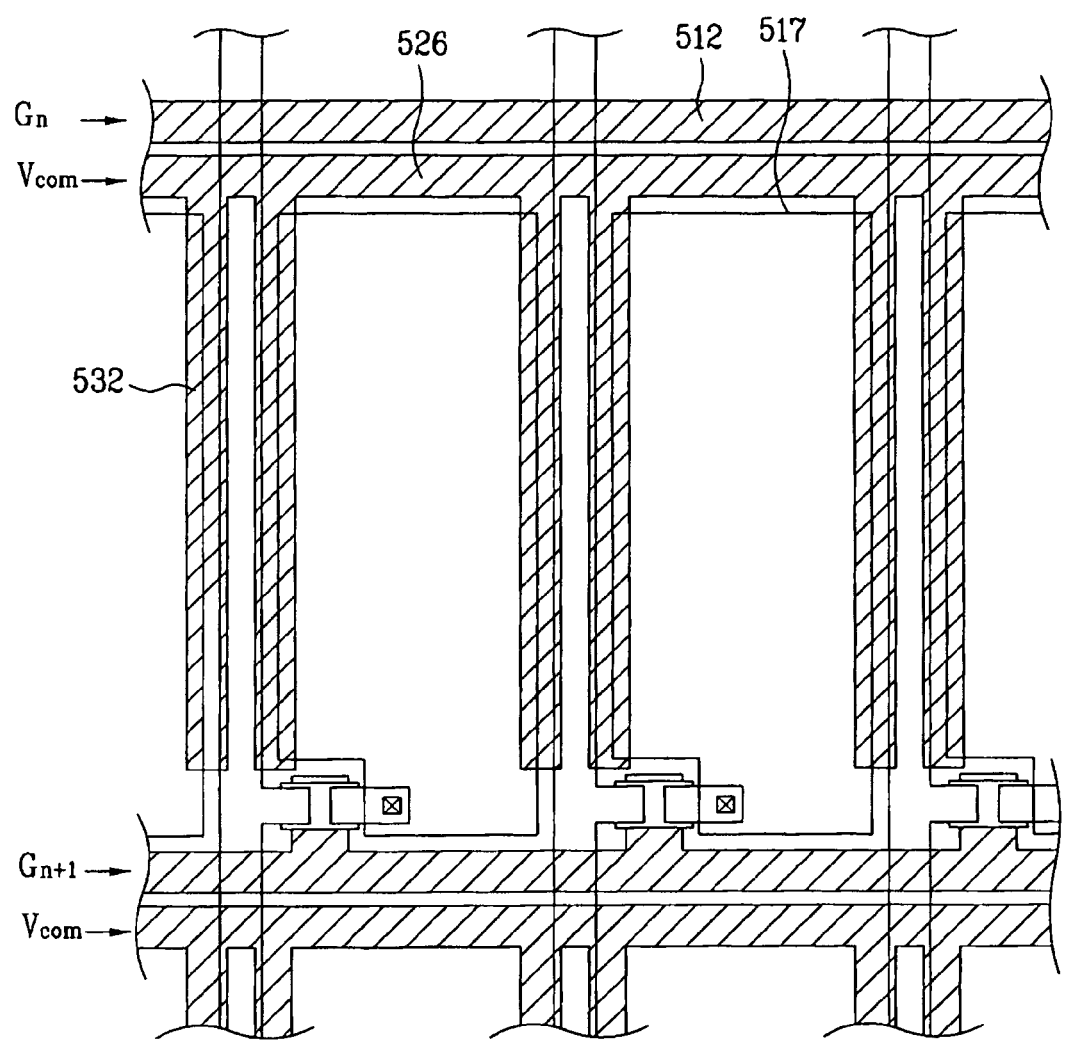
FIG. 6 is a plan view of an LCD device according to the third embodiment of the present invention.

FIG. 5 is a plan view of an LCD device according to the second embodiment of the present invention. FIG. 6 is a plan view of an LCD device according to the third embodiment of the present invention.

Unlike the LCD device according to the first embodiment of the present invention, in case of the LCD device according to the second embodiment of the present invention, a light-shielding metal 532 is not formed along a data line 515 in a fore gate line 512. As illustrated in FIG. 5, an additional common line 526 is formed substantially parallel with the gate line 512 of a pixel region, and then the light-shielding metal 532 projecting from the common line 526 is formed along the data line 515.

Except that, the LCD device according to the second embodiment of the present invention has the same structure as that in the LCD device according to the first embodiment of the present invention. In the LCD device according to the second embodiment of the present invention, the light-shielding metal 532 projecting from common line 526 is formed along the data line, wherein the common line 526 is formed between the data line 515 and a pixel electrode 517. The light-shielding metal 532 is formed as one body with the common line 526 to apply the electric field, and the light-shielding metal 532 is overlapped with the data line 515 and the pixel electrode 517. Or, the light-shielding metal 532 is overlapped with the pixel electrode 517, and a corner of the light-shielding metal 532 is positioned on the same line as a corner of a black matrix layer 522.

The LCD device according to the third embodiment of the present invention has the same structure as that of the LCD device according to the second embodiment of the present invention until forming a common line in a pixel region. However, in case of the LCD device according to the third embodiment of the present invention, as illustrated in FIG. 6, the common line 526 is additionally formed substantially parallel and adjacent to a gate line 512. Then, a light-shielding metal 532, projecting from the common line 526, is formed along a data line 515. In this state, a voltage is applied to the light-shielding metal 532. Also, the light-shielding metal 532 is formed between the data line 515 and a pixel electrode 517, and is overlapped with the data line 515 and the pixel electrode 517. Or, the light-shielding metal 532 is overlapped with the pixel electrode 517, and has a corner on the same line as a corner of a black matrix layer 522.

In the aforementioned LCD device according to the first embodiment of the present invention, the thin film transistor array substrate has a storage-on-gate structure. In the LCD devices according to the second and third embodiments of the present invention, the thin film transistor array substrate has a storage-on-common structure.

As mentioned above, the LCD device according to the present invention has the following advantages.

In the LCD device according to the present invention, the light-shielding metal is formed between the data line and the pixel electrode for being overlapped thereto, and the light-shielding metal is connected with the gate line or the common line. Because a voltage is applied to the light-shielding metal, the parasitic capacitance is decreased to about 9.760E-18[F/μm] between the data line and the pixel electrode. For example, in a four-mask LCD device using the passivation layer of the inorganic insulating material, the parasitic capacitance is about 2.876E-17[F/μm] between the data line and the pixel electrode. Accordingly, it is possible to solve the problem of vertical crosstalk and to prevent flicker and image sticking generated by the parasitic capacitance, thereby improving the picture quality.

In addition, because the light-shielding metal is overlapped with the data line and the pixel electrode in-between, it is possible to prevent the light leakage between the data line and the pixel electrode, thereby decreasing the bonding margin of the black matrix layer. Thus, the area of the black matrix layer decreases, whereby it is possible to improve the aperture ratio of the LCD device.

Furthermore, because the parasitic capacitance decreases, it is possible to use the passivation layer of the inorganic insulating material, thereby simplifying the fabrication process for formation of the passivation layer, and decreasing the step coverage.

In addition, there is no requirement for providing the passivation layer of the expensive organic insulating material such as BCB, so that it is possible to decrease the fabrication cost.

It will be apparent to those skilled in the art that various modifications and variations can be made in the present invention. Thus, it is intended that the present invention covers the modifications and variations of this invention provided they come within the scope of the appended claims and their equivalents.

What is claimed is:

1. An LCD device comprising:
 a gate line on a first substrate;
 a gate insulating layer on an entire surface of the first substrate including the gate line;
 a data line on the gate insulating layer substantially perpendicular to the gate line, to define a pixel region;
 a thin film transistor at a crossing of the gate and data lines;
 a passivation layer on a surface of the first substrate including the thin film transistor;
 a pixel electrode on the passivation layer connected with a drain electrode of the thin film transistor;
 a common line formed substantially in parallel with the gate line, formed between the gate line and the pixel electrode, and spaced apart from the pixel electrode; and
 a light-shielding metal preventing a parasitic capacitance between the data line and the pixel electrode and overlapping the pixel electrode and the data line between the data line and the pixel electrode, wherein the light-shielding metal projects from the common line.

2. The LCD device of claim 1, wherein the light-shielding metal projects from the common line in a direction parallel to the data line.

3. The LCD device of claim 1, wherein the passivation layer is an inorganic insulating material.

4. The LCD device of claim 3, wherein the inorganic insulating material is silicon nitride SiNx or silicon oxide SiOx.

5. The LCD device of claim 1, further comprising a second substrate having a black matrix layer, a color filter layer and a common electrode, said second substrate opposite the first substrate.

6. The LCD device of claim 5, wherein the black matrix layer has a corner on the same line as a corner of the light-shielding metal.

7. The LCD device of claim 1, wherein the light-shielding metal overlaps the pixel electrode and has a corner aligned with a corner of the data line.

8. The LCD device of claim 1, wherein a voltage is applied to the light-shielding metal.

9. The LCD device of claim 1, wherein a voltage is applied to the light-shielding metal through the common line.

10. The LCD device of claim 1, wherein the light-shielding metal is on the same layer as the gate line and is between the data un and the pixel electrode.

11. The LCD device of claim 1, wherein the light-shielding metal is formed of the same material with the gate line.

* * * * *